No. 769,029. PATENTED AUG. 30, 1904.
P. K. STERN.
THERMODYNAMIC PROCESS OF APPLYING LIQUID FUELS TO MOTIVE POWER APPARATUS.
APPLICATION FILED SEPT. 11, 1900.
NO MODEL.
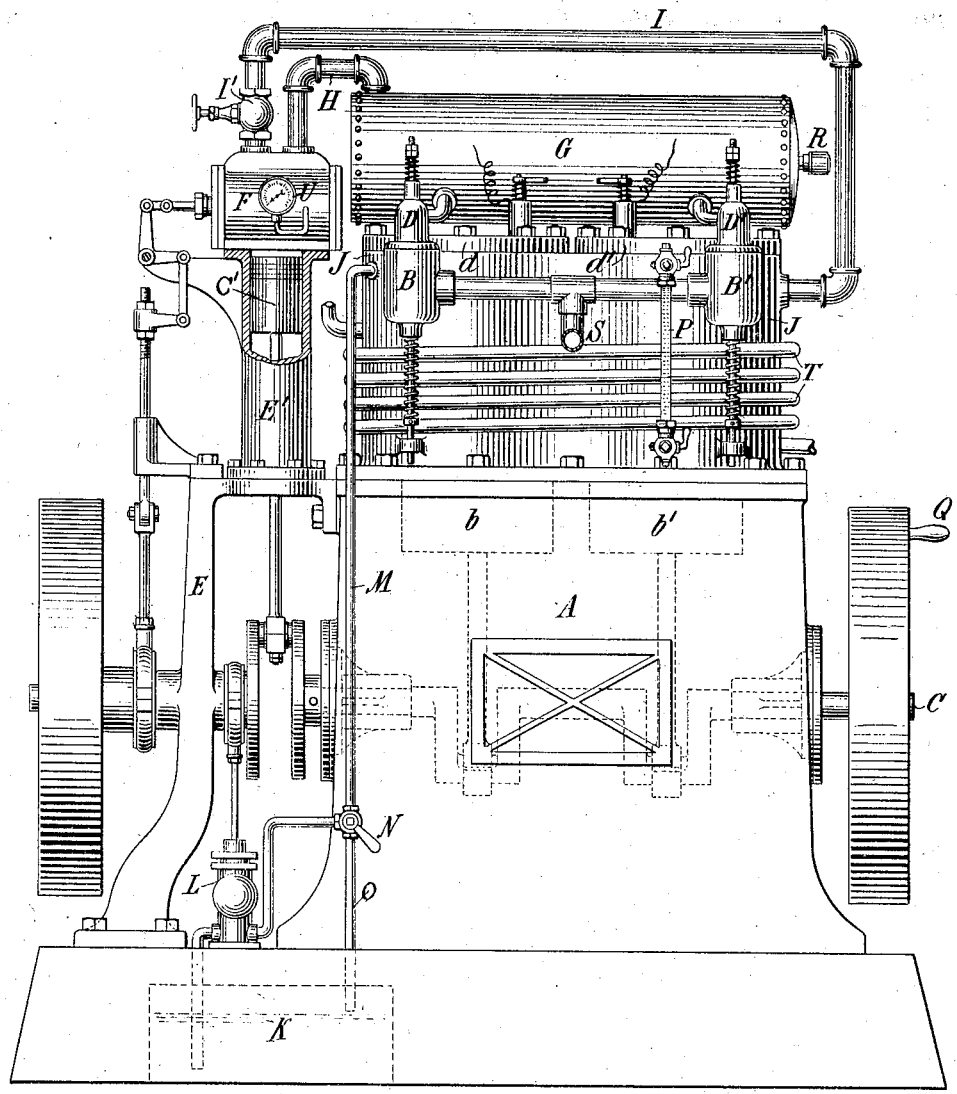
Witnesses: Chas. Wahlers
Lionel M. Stern
Inventor
Philip K. Stern No. 769,029.   Patented August 30, 1904.

UNITED STATES PATENT OFFICE.

PHILIP K. STERN, OF NEW YORK, N. Y.

THERMODYNAMIC PROCESS OF APPLYING LIQUID FUELS TO MOTIVE-POWER APPARATUS.

SPECIFICATION forming part of Letters Patent No. 769,029, dated August 30, 1904.

Application filed September 11, 1900. Serial No. 29,646. (No specimens.)

*To all whom it may concern:*

Be it known that I, PHILIP K. STERN, a citizen of the United States, residing at the city of New York, in the county of New York and State of New York, have invented a certain new and useful Thermodynamic Process in the Application of Liquid Fuels to Motive-Power Apparatus, of which the following is a specification.

This invention is designed to utilize the power derived from the expansion of such liquid fuels as petroleum or its derivatives or any of the inflammable hydrocarbon animal or vegetable oils in thermodynamic transformation, as well as the expansive properties of the gases which result from their combustion when suitably mixed with same oxidizing agent.

To this end my invention relates to the particular process of transforming both the sensible heat of a vapor, resulting from the expansion of the oil after passing from the liquid to the vaporous state into mechanical work, and also the kinetic energy due to the expansion of the gases resulting from combustion.

I apply my process in the development of motive power by employing, preferably, a liquid fuel for operating a thermodynamic machine consisting of two kinds of heat-engines, an explosive-engine and an expansive engine, and I shall occasionally refer to these two engines as sections of the thermodynamic machine, terming the explosive-engine the "explosive-section" and the expansive engine the "expansive section" of the thermodynamic machine. In applying my process I have directed my attention to explosive-engines in general, and therefore have adopted those commonly known as "gas" or "vapor" engines operated on either what is known as the "four-cycle" principle or what is designated the "two-cycle" explosive-engine; but more particularly has my attention been directed to those of the compression type as a means for effecting the vaporization of the fuel for operating the expansive engine in which the heat of the vapor is transformed into mechanical work. In heat-engines of the explosive type which have come to my notice the refrigeration necessary in consequence of the excessive heat developed by the combustion of the explosive mixture within the cylinder was accomplished by the use of some heat-absorbing medium, such as water, contained in a receptacle surrounding the cylinder or by a series of radiating disks or rings secured to the cylinder, whereby the surplus heat is dissipated by convection, while in some cases it has been suggested to use a volatile refrigerating liquid, whereby the excessive cylinder-heat may be employed to produce artificial refrigeration, in which case the water which would have been used in lieu of the refrigerating liquid for cooling the cylinder would be employed for taking up the heat of the refrigerating liquid. In any of these methods, however, the heat carried off by the water-jacket or radiating-surfaces dissipates and wastes about forty per cent. of the heat available for performing the work of the engine.

While all of the so-called "expansive" engines which are in use at the present time, so far as I am aware, employ a power medium in the form of a vapor, energized by the combustion of a fuel in the furnace of a vapor-generator, the amount of heat in the fuel that is taken from the furnace and transmitted to the vapor is but a fraction of the heat liberated by the fuel during combustion. It is well known in the art that the dissipation of heat in developing mechanical work by the expansive process of a power medium is much more excessive than when the mechanical work is developed by the explosive process of the combustibles. By my process I combine these two methods of transforming heat into mechanical work, so that the heat of the explosive type of heat-engine, which is not all available in practice, may in part be applied so as to perform mechanical work by the expansive process, and by this process (whereby the two distinct methods of transforming heat into mechanical work are blended) the vapor-generator for the expansive engine and the cooling-jacket for the explosive-engine are combined, and these two distinctive methods (which have heretofore been separated and independently considered) in motive-power development are so combined in one heat-engine or thermodynamic machine by the application of the fuel, according to my process, as to provide for the one by the other what either of them is lacking.

During the operation of steam or vapor engines and after the vapor has given up its available energy to the working piston and is then exhausted a considerable amount of heat is carried off by the exhaust, which being at a lower temperature than that which can be utilized in the transformation of heat into mechanical work is thrown out into the atmosphere or into a condenser and dissipated just as the surplus heat generated by the combustion of the explosive mixture in the cylinder of an explosive-engine is carried off by the water-jacket or radiating-surfaces depending from the cylinder of the engine. In combining the two methods of operating a heat-engine according to my process the exhaust from the expansive section is taken into the cylinder of the explosive-section, and the heat contained in the exhaust-vapor is utilized in increasing the activity of chemical combination of the gases employed in the explosive process, and reciprocally the surplus heat which is developed in the cylinder of the explosive-section is transmitted to the liquid, thence to the cylinder of the expansive section. Thus by this interchange the heat which would otherwise have been wasted is employed usefully. I consider this feature a distinct advance in the application of thermodynamics to motive-power development and of considerable advantage to the art to which my invention pertains.

The process which I employ is a double thermodynamic transformation in which I first volatilize by the excess of the cylinder-heat, due to a primary combustion, a quantity of the liquid fuel contained in a cooling-jacket surrounding the cylinder, (the energized vapor being employed to effect a thermodynamic transformation,) after which it is further employed to effect a second thermodynamic transformation by the heat due to its chemical combination. The two thermodynamic transformations being aggregated, the result is a double thermodynamic transformation of the fuel. The liquid fuel in the cooling-jacket upon being heated by the combustion of gases in the cylinder will become vaporized, so as to develop sufficient pressure (in consequence of the sensible heat contained in the vapor) to operate a secondary piston expansively, and after the vapor has expanded, so as to give up its heat in the form of mechanical work to the secondary piston, the vapor is exhausted into a fuel-feed receptacle or clearance-space behind the piston, which is adapted to operate by the expansion of the gases due to combustion and is there mixed with atmospheric air, thus producing the explosive mixture necessary to operate the thermodynamic machine.

A thermodynamic machine to which my process may be applied is illustrated in the accompanying drawing, which forms part of this specification, which is a front elevation of an ordinary two-cylinder gas-engine of the four-cycle type, with a single-acting single-cylinder steam-engine adjoining connected up as a unit.

I employ the double-cylinder Otto or four-cycle type of gas-engine A, having the usual puppet exhaust-valves B and B' and the intake fuel-supply valves D and D' for each of the cylinders, the puppet exhaust-valves B and B' being operated by cams driven by a system of gear by the crank-shaft C. The gas-engine A is connected up by the crank-shaft C to a single-cylinder single-acting steam-engine E of the same stroke, having a steam-chest F and the usual slide-valve and valve-gear for automatically controlling the cut-off of the vapor, according to the speed of the crank-shaft, in a manner so that the cranks of the gas-engine which are on the same centers will be on opposite centers with the steam-engine. Though I have qualified the engine E and its different parts as a steam-engine in consequence of its characteristic features, I do not mean that the engine must necessarily be operated by steam, as any other vapor may be used to operate a steam-engine, and yet the engine would essentially be a steam-engine, irrespective of whatever vapor might be used to operate it. I mean, therefore, an engine of that class known by engineers and others familiar with the art as a "steam-engine." The inside diameter of the cylinder E' or its bore is of a cross-section less than one-seventh of the cross-section of the bore of one of the gas-engine cylinders.

To the intake-valves D and D', through which the explosive mixture for the gas-engine is drawn into the cylinders by the downward movement of its pistons, I connect the exhaust-drum G of the steam-engine, which is connected to the steam-chest F by the exhaust outlet-pipe H. The live-vapor pipe I, having a throttle-valve, is connected to the cooling-jacket J and to the steam-chest of the engine, so as to supply the vapor to operate the engine. The water or liquid fuel—such as naphtha, alcohol, &c.—contained in the jacket J is pumped up from the supply-tank K, which I have shown for convenience located under the base of the engine, by a small feed-pump L, driven by an eccentric on the crank-shaft. The liquid is lifted from the tank K by the suction of the pump and forced up the feed-pipe M into the uppermost part of the jacket J. A three-way cock N and return-pipe O will enable the operator to regulate the feed by observing the liquid-level in the jacket J by the water-column gage-glass P precisely as in the feed of ordinary steam-boilers. When there is too great a quantity of liquid in the jacket, as observed by the gage, the cock N is turned down into the position shown in the drawings. This will cut off the pipe M and establish communication through return-pipe O to supply-tank K.

To start the engine, the crank-shaft is rotated by the handle Q in the ordinary way for starting gas-engines, and when a sufficient amount of motion has been imparted to the crank-shaft the piston C' in the meanwhile being drawn in and out will serve the purpose of a pump and will fill its cylinder with that quantity of vapor due to this exhausting process of the volatile liquid admitted by the engine slide-valve and throttle-valve I', and upon the engine E exhausting from the cylinder E' the vapor will be drawn into the exhaust-drum G, which is filled with the air by the downward movement of the gas-engine pistons, the air being taken through the intake air-valve R. The mixture of air and vapor in G is taken into the cylinders of the gas-engine A and ignited in the usual manner.

I prefer to adjust the cams for lifting the puppet-valves B and B' so as to stand at angles of about one hundred and eighty degrees apart, so that when the puppet-valve B is open B' will be closed, and vice versa. The ignition-cams must in this case be adjusted so as to ignite alternately. With this means of adjustment and assuming the exhaust puppet-valve B to be lifted, so as to open just after $b$ has reached the end of its working stroke, the exhaust from the cylinder $d$, connected with puppet-valve B, will pass out of the exhaust-outlet S. The puppet-valve B' is also connected to the outlet S. In the meanwhile the other piston, $b'$, descending draws its charge into the cylinder $d'$ by the intake-valve D', and upon ascending the explosive mixture is compressed and ignited, producing a working stroke for the piston $b'$, at which time $b$ is descending and taking in its charge, and throughout the operation when one cylinder is being charged by the operation of its piston the other one is working. With this manner of operation the exhaust-vapor from the cylinder E' of the steam-engine, which is exhausted into the drum G, is taken up alternately, first by one cylinder then by the other. Whatever volume of air and vapor a piston displaces and draws into its cylinder from the drum G through its intake-valve reduces the pressure in the drum G, so that a balance of pressure is obtained by air entering the intake-valve R, and when the valve travel of the steam-engine varies to meet the requirements of load according to the action of the governor the vapor entering the drum G will be a variable quantity. On heavy loads, or loads which will retard the crank-shaft, more vapor will be admitted to the drum G. Therefore less air will be taken in through the intake-valve R. The point of cut off of the vapor by the valve during the operation of the engine and the initial piston-pressure should be adjusted so as to be commensurate with the consumption of vapor by combustion in the two cylinders of the gas-engine. The pressure of the vapor may be reduced by a refrigerator T, consisting of a coil of pipe surrounding the cooling-jacket, through which water as a carrier of heat may be made to circulate or wherein a surplus of fuel may be kept and connected with the tank K by suitable pipes in a manner so as to lose part of the heat of the cooling-jacket by radiation, according to the quantity of the heat-carrier contained in the refrigerator and the rapidity of its circulation. A gage U is connected with the steam-chest F, so as to indicate the pressure.

In carrying out my improved thermodynamic process of utilizing liquid fuels another medium may be introduced to effect the sensible heat of evaporation, so as to develop mechanical work by a subdivision of the heat of the chemical combination resulting from the combustion of the fuel (a part of the heat being used to vaporize any other liquid, such as water) by generating steam and the remainder of the available heat of chemical combination being thermodynamically transformed by an internal-combustion engine, in which case I charge the cooling-jacket J with water in lieu of with a liquid fuel, and when it is desired to operate the steam-engine in the ordinary way by steam the exhaust-pipe H is disconnected from the drum and a suitable superheating device, such as is commonly employed in connection with the generating plants of marine engines, is introduced and coupled up between the drum G and the pipe H, in which case a suitable portion of the exhaust-steam when sufficiently superheated is used as an ingredient of the explosive mixture for the gas-engine and is taken into the cylinders with the fuel, so as to increase its calorific value.

The method upon which I operate an explosive-engine according to my process may be carried out by a large variety of the gas-engines or gasolene-vapor engines in use at the present time by arranging the valves and ignition devices so as to work in accordance with the proper cycles necessary for the operation of the engine, which may be done by adjusting the cams. In making use of existing engines to work on this principle it is obvious that three cylinders would be necessary when gas-engines of the Otto type are used; but in lieu of the two-cylinder engine A two single-cylinder Otto type engines may be connected up with one separate small-bore cylinder for the vapor. For gas-engines of the two-cycle type only two cylinders would be required, one of which being the small-bore steam-engine cylinder described and the other the two-cycle gas-engine cylinder. It is obvious that this method of operating explosive-engines could be applied to engines of the two-cycle type by simply adjusting the valves to operate rythmically with the supply and demand of the vapor of the vapor-engine E and the consumption of the exhaust-vapor of the engine E in the explosive-engine.

In making use of the term "explosive-engine" throughout this specification I mean those engines in which the fuel is burned behind the piston within the working cylinder, and therefore the term has reference to a variety of engines of the slow-combustion type, in which the fuel is fed in more or less gradually and consumed behind the working piston, and as I do not desire to confine my process to either rapid or slow combustion engines I wish to make myself explicit in this respect, that in using the term "explosive-engine" I mean those engines known to the trade as the internal-combustion type, as well as those commonly known as the explosive type, as my process may be employed with either the slow or rapid combustion type of engine without departing in the least from the nature of the invention.

Having fully described my invention so that those skilled in the art to which it pertains can employ the thermodynamic process herein described in the development of motive power when applied in accordance with the description in the foregoing specification, I claim as new and desire to secure by Letters Patent of the United States—

1. The herein-described thermodynamic process employed in the operation of a thermodynamic machine embodying an explosive-engine and an expansive engine, consisting in burning the fuel for the explosive-engine in its cylinder so as to transform its available heat into mechanical energy and absorbing surplus heat transmitted through the cylinder-walls, by a volatile liquid, so as to evaporate the said liquid, then employing the vapor expansively, in the expansive engine, so as to transform its sensible heat into mechanical work, then utilizing the vapor as an ingredient of the explosive mixture in the cylinder of the explosive-engine, thereby continuing the operation of the thermodynamic machine, substantially as described.

2. The herein-described thermodynamic process employed in the operation of a thermodynamic machine embodying an explosive-engine and an expansive engine, consisting in burning the fuel for the explosive-engine in its cylinder so as to transform its available heat into mechanical energy, and absorbing surplus heat transmitted through the cylinder-walls, by a liquid fuel for the thermodynamic machine, so as to evaporate the said liquid fuel, then employing the vapor as an expansive agent for operating the expansive engine, then utilizing the vapor suitably mixed with atmospheric air so as to obtain the explosive mixture for the explosive-engine, thereby continuing the operation of the thermodynamic machine; substantially as described.

3. The herein-described thermodynamic process employed in the operation of a thermodynamic machine embodying an explosive-engine and an expansive engine consisting in burning a fuel for the explosive-engine in its cylinder so as to transform its available heat into mechanical energy and applying a volatile liquid to the cylinder of the explosive-engine so as to absorb surplus heat transmitted through the cylinder-walls by the said liquid so as to evaporate the same, then employing the vapor expansively so as to transform its sensible heat into mechanical work, then utilizing the vapor as an ingredient of the explosive mixture in the cylinder of the explosive-engine, thereby continuing the operation of the thermodynamic machine; substantially as described.

4. The herein-described thermodynamic process employed in the operation of a thermodynamic machine embodying an explosive-engine and an expansive engine consisting in burning a fuel for the explosive-engine in its cylinder so as to transform its available heat into mechanical energy and applying a volatile liquid for operating the thermodynamic machine to the cylinder of the explosive-engine, so as to absorb surplus heat transmitted through the cylinder-walls by the said liquid so as to evaporate the same, then employing the vapor expansively so as to transform its sensible heat into mechanical work, then utilizing the vapor suitably mixed with atmospheric air so as to produce the explosive mixture in the cylinder of the explosive-engine, thereby continuing the operation of the thermodynamic machine; substantially as described.

5. The herein-described thermodynamic process employed in the operation of a thermodynamic machine embodying an explosive-engine and an expansive engine, consisting in burning the fuel for the explosive-engine in its cylinder so as to transform its available heat into mechanical energy and absorbing the excess of the cylinder heat by a volatile hydrocarbon liquid, so as to evaporate the same, then employing the vapor thermodynamically in the expansive engine, then exploding a mixture containing the said vapor and a suitable quantity of atmospheric air in the working cylinder or cylinders of the explosive-engine for continuing the operation of the thermodynamic machine; substantially as described.

6. The herein-described thermodynamic process employed in the operation of a thermodynamic machine embodying an internal-combustion engine and an expansive engine consisting in burning the fuel for the explosive-engine in its cylinder so as to transform its available heat into mechanical energy and employing surplus heat transmitted through the cylinder-walls to expand a volatile liquid into a vapor, then employing this vapor thermodynamically in the thermodynamic machine, so as to effect a further thermodynamic transformation, then using this vapor as an ingredient of the explosive mixture in the cylinder of the explosive-engine, thereby continuing the operation of the thermodynamic machine; substantially as described.

7. The process of liberating and transforming the potential energy contained in liquid fuels, in the operation of a thermodynamic machine, consisting in first burning a quantity of the said liquid fuel within the thermodynamic machine wherein some of the heat of the combustion of the said fuel is transformed into mechanical work, and wherein heat developed within the aforesaid thermodynamic machine is radiated from the said thermodynamic machine, then subjecting a quantity of the said liquid fuel to the action of the said radiated heat, thereby vaporizing the said fuel, then applying the kinetic energy of this vapor to the power-shaft of the thermodynamic machine so as to effect further transformation of the heat of the aforesaid combustion into mechanical work, then conveying this vapor into the thermodynamic machine and burning it as a fuel as aforesaid; substantially as described.

8. The herein-described process of utilizing liquid fuels employed in the operation of a thermodynamic machine having an explosive-engine whereby some of the heat of the fuel is transformed into mechanical energy, consisting in applying the liquid fuel to be used in the operation of the thermodynamic machine to the exterior of the cylinder or cylinders of the explosive-engine, in a manner whereby the said fuel will be vaporized by surplus heat of combustion, transmitted through the cylinder-walls, then applying the heat of the vapor to the power-shaft of the thermodynamic machine so as to transform said surplus heat into mechanical work, then consuming the evaporated fuel in the working cylinder of the explosive-engine; substantially as described.

9. In the operation of a thermodynamic machine having a power medium and wherein kinetic energy is developed by chemical combination, the following cycle: first applying the said kinetic energy directly to a movable element of the said machine to develop mechanical energy by the kinetic energy thus available, then applying part of the said kinetic energy through the power medium to another movable element of the thermodynamic machine to develop further mechanical energy for the said machine, then finally introducing the power medium in the aforesaid combination as an active ingredient; substantially as described.

10. In the herein-described thermodynamic process of utilizing liquid fuels for operating a thermodynamic machine embodying an explosive-engine and an expansive engine, the following cycle: first applying the fuel to the thermodynamic machine so as to take up some of the heat due to the chemical combination of atmospheric air with a liquid fuel to develop a part of the mechanical work of the thermodynamic machine, then applying a portion of the said heat to the thermodynamic machine to evaporate the said liquid fuel so as to develop sensible heat in the vapor, then utilizing this sensible heat of the vapor to operate the expansive engine, thereby augmenting the power of the thermodynamic machine, and then mixing the vapor with the aforesaid atmospheric air and igniting the mixture in the cylinder or cylinders of the explosive-engine; substantially as described.

In testimony whereof I have signed my name to this specification in the presence of two subscribing witnesses.

PHILIP K. STERN.

Witnesses:
CHAS. WAHLERS,
LIONEL M. STERN.